United States Patent
Treharne et al.

(10) Patent No.: US 8,903,579 B2
(45) Date of Patent: Dec. 2, 2014

(54) USER OVERRIDE FOR ELECTRIC-ONLY OPERATION OF A HYBRID VEHICLE

(71) Applicant: Ford Global Technologies, LLC, Dearborn, MI (US)

(72) Inventors: William David Treharne, Ypsilanti, MI (US); Paul Stephen Bryan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 43 days.

(21) Appl. No.: 13/655,517

(22) Filed: Oct. 19, 2012

(65) Prior Publication Data

US 2014/0114512 A1   Apr. 24, 2014

(51) Int. Cl.
- *B60L 9/00* (2006.01)
- *B60L 11/00* (2006.01)
- *G05D 1/00* (2006.01)
- *G05D 3/00* (2006.01)
- *G06F 7/00* (2006.01)
- *G06F 17/00* (2006.01)

(52) U.S. Cl.
USPC ........ 701/22; 180/65.23; 180/65.28; 903/903

(58) Field of Classification Search
CPC ..... B60W 20/00; B60W 10/06; B60W 10/08; B60W 10/04; B60W 30/182
USPC ................ 701/22; 180/65.23, 65.28; 903/903
See application file for complete search history.

(56) References Cited

U.S. PATENT DOCUMENTS

| | | | |
|---|---|---|---|
| 8,224,514 B2 * | 7/2012 | Center et al. ................... | 701/22 |
| 8,423,219 B2 * | 4/2013 | Tofukuji et al. ................. | 701/22 |
| 2009/0287366 A1 * | 11/2009 | Davis et al. ...................... | 701/22 |
| 2010/0087973 A1 | 4/2010 | Kaita et al. | |
| 2010/0138089 A1 | 6/2010 | James | |
| 2011/0166733 A1 | 7/2011 | Yu et al. | |
| 2011/0202210 A1 * | 8/2011 | Goda ............................... | 701/22 |
| 2011/0270481 A1 * | 11/2011 | Koga et al. ...................... | 701/22 |
| 2011/0307134 A1 | 12/2011 | Yoshimi | |
| 2012/0109438 A1 | 5/2012 | Akebono et al. | |
| 2012/0203406 A1 | 8/2012 | Akebono et al. | |
| 2013/0030635 A1 | 1/2013 | Morita | |
| 2013/0173103 A1 * | 7/2013 | Ando et al. ...................... | 701/22 |

OTHER PUBLICATIONS

Non-Final Office Action for U.S. Appl. No. 13/655,805, mailed Jul. 22, 2014, 15 pages.

* cited by examiner

*Primary Examiner* — Calvin Cheung
*Assistant Examiner* — Paula L Schneider
(74) *Attorney, Agent, or Firm* — David B. Kelley; Brooks Kushman P.C.

(57) ABSTRACT

A vehicle and a method of controlling the vehicle are provided. The vehicle controller is configured to (i) in response to the user interface receiving input selecting an electric-only operating (EV) mode, disable the engine such that the vehicle is propelled by the electric machine, (ii) in response to the user interface receiving input overriding EV mode, re-enabling the engine for a predetermined time period. A vehicle is provided with a controller. In response to input selecting an electric-only operating (EV) mode, an engine is disabled such that the vehicle is propelled by an electric machine. In response to user power demand being greater than power available during the EV mode, a prompt is generated inquiring whether to override the EV mode. In response to user confirmation to override the EV mode, the engine is re-enabled to satisfy the user power demand.

18 Claims, 4 Drawing Sheets

USER OVERRIDE FOR ELECTRIC-ONLY OPERATION OF A HYBRID VEHICLE

TECHNICAL FIELD

Various embodiments relate to electric operation of a hybrid vehicle and methods of controlling the vehicle.

BACKGROUND

A hybrid electric vehicle (HEV) or a plug-in hybrid electric vehicle (PHEV) has more than one source of power. An electric machine may be configured to propel the vehicle and uses a battery as a source of energy. For a PHEV, the battery may be recharged using an external power source, such as a charging station. An engine may also be configured to propel the vehicle and use fuel as a source of energy. The PHEV can be controlled to use the electric machine and/or the engine to operate the vehicle and meet user demand.

SUMMARY

In an embodiment, a vehicle is provided with an electric machine, an engine, and a controller. The controller is configured to (i) in response to input selecting an electric-only operating mode, disable an engine such that the vehicle is propelled by an electric machine, (ii) in response to user power demand being greater than power available during the electric-only operating mode, generate a prompt to inquire whether to override the electric-only operating mode, and (iii) in response to user confirmation to override the electric-only operating mode, re-enable the engine to satisfy the user power demand.

In another embodiment, a vehicle is provided with an engine, an electric machine, a user interface, and at least one controller. The at least one controller is configured to (i) in response to the user interface receiving input selecting an electric-only operating (EV) mode, disable the engine such that the vehicle is propelled by the electric machine, (ii) in response to the user interface receiving input overriding EV mode, re-enabling the engine for a predetermined time period.

In yet another embodiment, a method for controlling a vehicle is provided. In response to user input selecting an electric-only operating (EV) mode, an engine is disabled such that the vehicle is propelled by an electric machine. In response to receiving a user input to override the EV mode, the engine is re-enabled for a predetermined time period.

Various embodiments of the present disclosure have associated non-limiting advantages. For example, the vehicle is configured to provide a user selected, electric-only (EV) mode of operation, allowing user control and input regarding vehicle operation. The user may override the user selected EV mode of operation using a user interface. The override may be used when a user input or request to the vehicle indicates a need for the engine to be enabled, and the vehicle to operate in a hybrid mode. The controller is configured to change the operating state of the vehicle to a hybrid mode of operation after receiving the user override. The controller sends a message to the user to select and/or confirm the override. The controller may also provide a message that the vehicle is operating in a hybrid mode via a user interface such that the user's expectations regarding vehicle operation are met and the user is informed of potential engine operation after having selected an EV mode of operation for the vehicle. The controller is configured to return the vehicle to the user selected EV mode after the user input or request to the vehicle that caused the EV mode override and the engine to be enabled ends. The vehicle is returned to the user selected EV mode by the controller.

DETAILED DESCRIPTION

As required, detailed embodiments of the present disclosure are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Plug-in hybrid electric vehicles (PHEV) utilize a larger capacity battery pack than a standard hybrid electric vehicle (HEV). PHEVs have the capability to recharge the battery from a standard electrical outlet or charging station connected to the external electric grid to reduce fuel consumption and to improve the vehicle's fuel economy. The PHEV structure is used in the figures and to describe the various embodiments below; however, it is contemplated that the various embodiments may be used with vehicles having other vehicle architectures as are known in the art. The PHEV engine may be a compression or spark ignition internal combustion engine, or an external combustion engine, and the use of various fuels is contemplated. In one example, the vehicle has the ability to connect to an external electric grid, such as in a plug-in electric hybrid vehicle (PHEV).

Besides the gasoline fuel energy, a PHEV also has an additional energy source of electrical energy stored in the battery, which may be electric energy from the electric grid deposited in the vehicle's battery during charging. The power management of the PHEV allocates the drive power demand of the vehicle to one or both of the two energy sources in order to achieve an improved fuel economy and meet the other comparable HEV/PHEV control objectives. While conventional HEVs may be operated in order to maintain the battery State of Charge (SOC) around a constant level, it may be desirable for PHEVs to use as much pre-saved battery electric (grid) energy as possible before the next charge event (when the vehicle is "plugged-in"). To increase fuel economy, the relatively inexpensive, grid-supplied electric energy may be preferentially used to save as much gasoline fuel as possible.

Figure 1:
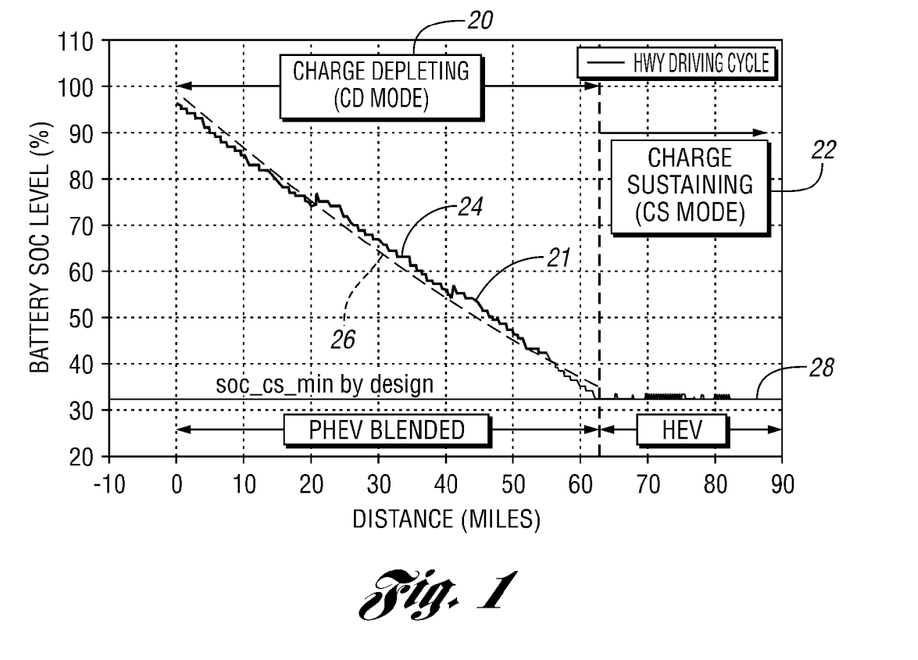
FIG. 1 is a chart illustrating two modes of operation for a plug-in electric vehicle according to an embodiment.

Generally, a PHEV has two basic operating modes as seen in FIG. 1. In a Charge Depleting (CD) mode 20 the battery electric energy 21 may be primarily used to propel the vehicle. The engine assists the vehicle drive power supply only in certain driving conditions or at excessive drive power requests during the basic charge depleting mode. One characteristic in the CD mode 20 is that the electric motor consumes more energy from the battery 21 than can be regenerated. In a Charge Sustaining (CS) mode 22 (or HEV mode), the vehicle reduces the electric motor propulsion usage to be able to keep the battery's State of Charge (SOC) 21 at a constant or approximately constant level by increasing the engine propulsion usage such that the SOC level is generally maintained.

The PHEV may operate in an Electric Vehicle (EV) mode where the electric motor is used (without help from the gasoline engine depending on PHEV strategy) for vehicle propulsion, depleting the battery up to its maximal allowable discharging rate under certain driving patterns/cycles. The EV mode is an example of a CD mode of operation for a PHEV. During an EV mode, the battery charge may increase in some circumstances, for example due to a period of regenerative braking. The engine is generally not permitted to operate under a default EV mode, but may need to be operated based on a vehicle system state or as permitted by the operator through an override or hybrid operation selection as described further below.

For the vehicle operation as shown in FIG. 1, once the battery SOC 21 decreases to a predefined charge sustaining level 28, the vehicle switches to CS mode 22, where the battery SOC 21 is kept within a vicinity of the charge sustaining SOC level, and the vehicle is primarily powered by the engine (fuel energy). The vehicle may also operate with the CD and CS modes in any order, or with CD and CS modes occurring multiple times during a key cycle. Also, the CD mode may have various battery discharging rates, or slopes. For example, the vehicle may be operated in CS mode at a battery SOC above level 28, either based on a user selection, vehicle management, or the like, and then be operated in a CD mode to use additional battery power.

In order to extend PHEV operational flexibility, the user may have the ability to select a preferred PHEV operation mode actively between electric and hybrid operation (EV/HEV) to override the automatic mode where the vehicle controller selects an operational mode for the vehicle. This permits a user to control the vehicle emissions, noise, and the like along the trip, and control the source of the power used by the vehicle, i.e. gasoline vs electricity. For example, the user may start by requesting an HEV driving mode 28 (battery charge sustaining at a high SOC off-charge) in the initial section of the trip. This saves the battery electric energy 21 such that the user can later switch to an EV driving mode 24 at another location where EV operation of the vehicle is desirable.

When the user selects a preferred PHEV operation mode using an interface in the vehicle, such as EV/HEV buttons, the user's inputs may disrupt the normal vehicle energy management strategy. The user has the freedom to actively manage the energy usage for his/her vehicle. The more a user uses the vehicle, the better he/she can understand the vehicle energy usage property, which will lead to familiarity and better optimization that the user can exercise with the battery energy usage tool. The manual energy planning feature will not only enable the user to simply select EV/HEV driving mode, but allows the user to actively plan the battery electric energy usage and fuel usage for the trip. Although the present disclosure describes the various embodiments in terms of a PHEV, any hybrid electric vehicle having an interface permitting the user to select or control the operating mode of the vehicle may be used.

Figure 2:
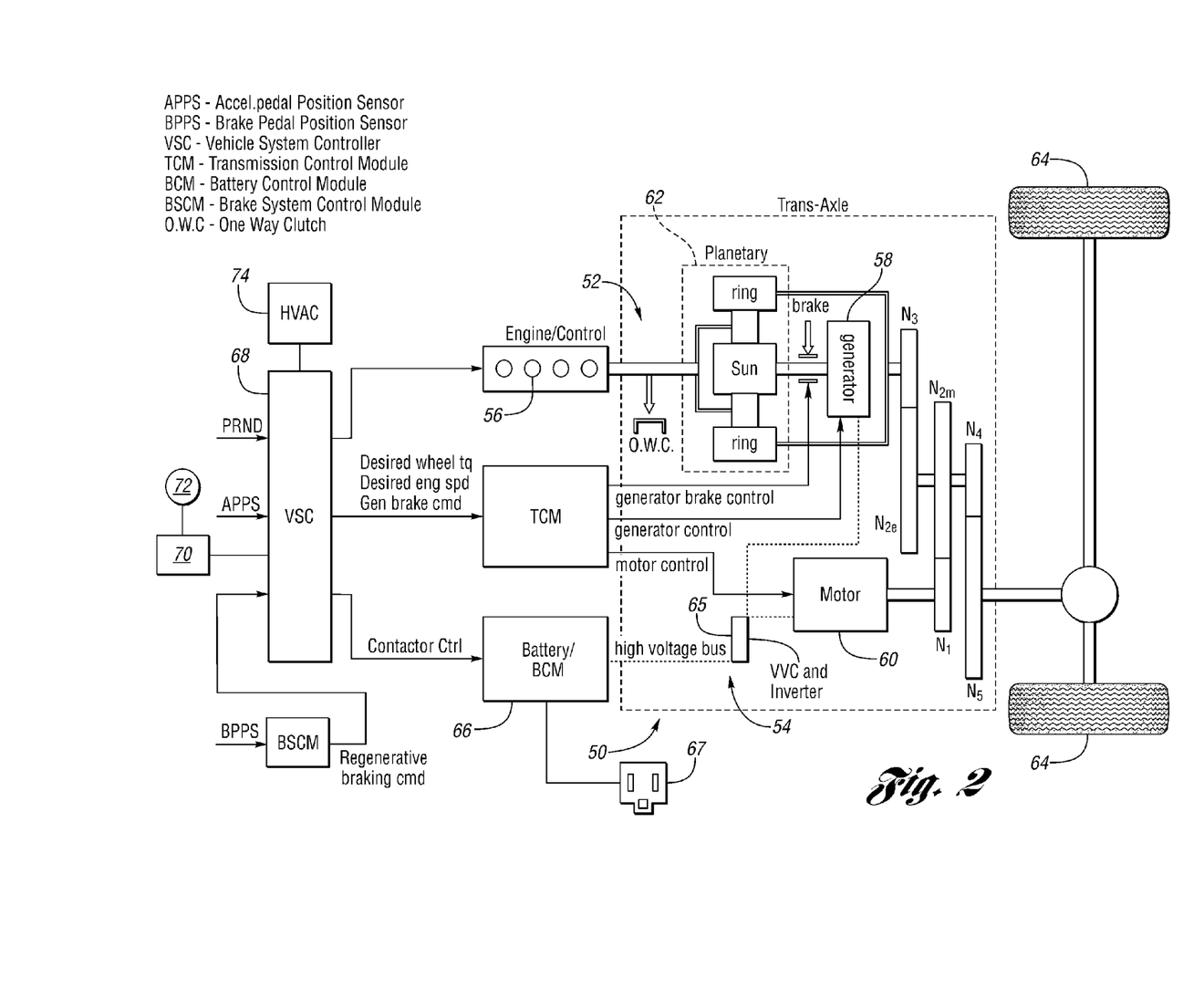
FIG. 2 is a schematic of a hybrid vehicle capable of implementing various embodiments of the present disclosure.

One example of a power split PHEV 50 capable of implementing the present disclosure is shown in FIG. 2. Of course, the PHEV 50 may be any hybrid vehicle as is known in the art that has an interface permitting the user to select or control the operating mode. FIG. 2 illustrates a power split hybrid electric vehicle 50 powertrain configuration and control system, which is a parallel hybrid electric vehicle. In this powertrain configuration, there are two power sources 52, 54 that are connected to the driveline. The first power source 52 is a combination of engine and generator subsystems using a planetary gear set to connect to each other. The second power source 54 is an electric drive system (motor, generator, and battery subsystems). The battery subsystem is an energy storage system for the generator and the motor and includes a traction battery.

During operation of the vehicle 50 using the second power source 54, the electric motor 60 draws power from the battery 66 and provides propulsion independently from the engine 56 to the vehicle 50 for forward and reverse motions. An inverter 65 may be positioned between the battery 66 and the electric machine 60 and generator 58. The inverter 65 may include a variable voltage converter as well. This operating mode is called "electric drive". In addition, the generator 58 can draw power from the battery 66 and drive against a one-way clutch coupling on the engine output shaft to propel the vehicle forward. The generator 58 can propel the vehicle forward alone when necessary.

The operation of this power split powertrain system, unlike conventional powertrain systems integrates the two power sources 52, 54 to work together seamlessly to meet the user's demand without exceeding the system's limits (such as battery limits) while optimizing the total powertrain system efficiency and performance. Coordination control between the two power sources is needed.

As shown in FIG. 2, there is a hierarchical vehicle system controller (VSC) 68 that performs the coordination control in this power split powertrain system. Under normal powertrain conditions (no subsystems/components faulted), the VSC 68 interprets the user's demands (e.g. PRND and acceleration or deceleration demand), and then determines the wheel torque command based on the user demand and powertrain limits. In addition, the VSC 68 determines when and how much torque each power source needs to provide in order to meet the user's torque demand and achieve the operating point (torque and speed) of the engine.

The VSC 68, which includes an electronic control unit (ECU), is connected to or integrated with a human-machine interface (HMI) 70, or user interface. The user interface 70 may include a user input and a display. The user input may be touch screen and/or a series of tactile buttons. The display may be a screen and/or gauges for displaying information to the user.

The control system for the vehicle 50 may include any number of controllers, and may be integrated into a single controller, or have various modules. Some or all of the controllers may be connected by a controller area network (CAN) or other system.

The engine 56 is fueled by gasoline or another fuel contained in a fuel tank in fluid communication with the fuel injectors or another fuel delivery system for the engine 56. The fuel tank may be refueled by a user.

The battery 66 may be recharged or partially recharged using a charging adapter 67 connected to a charging station powered by an external power source, such as the electrical grid, a solar panel, and the like. In one embodiment, the charging adapter 67 contains an inverter and/or a transformer on-board the vehicle.

The VSC 68 may receive signals or inputs from various sources to control the vehicle. These inputs include a user selected vehicle mode and a vehicle state such as battery state, fuel level, engine temperature, oil temperature, tire pressure, and the like. Route and map information may also be provided to the VSC 68 from a navigation system, which may be incorporated into the user interface 70.

An EV button 72, or other user input of the user interface 70, provides for user selection of PHEV operation using electrical energy from the battery in an EV mode, resulting in a user selected EV mode. In the user selected EV mode, the PHEV operates in a charge depletion (CD) mode and the engine 56 may be disabled. The engine may be pulled up by the VSC 68 beyond predetermined vehicle power, speed, or other thresholds in an override of the user selected EV mode. The EV button 72 may be incorporated into the VSC 68 and the human machine interface 70 to allow the user to manually select between EV, HEV, and automatic operational modes for the vehicle. The button 72 allows the user to pre-determine and control the vehicle operation mode among EV, HEV, and automatic (VSC 68 selected) modes for a charge cycle or a key cycle.

The VSC 68 may also be in communication with a heating, ventilation, and air-conditioning system (HVAC) 74 for the vehicle. The HVAC system 74 may be in thermal communication with the engine 56, the engine coolant, the engine exhaust, an electric heater powered by the battery 66, and the like to provide heat to the passenger cabin, or to provide a defrost function for the vehicle as is known in the art.

Figure 3:
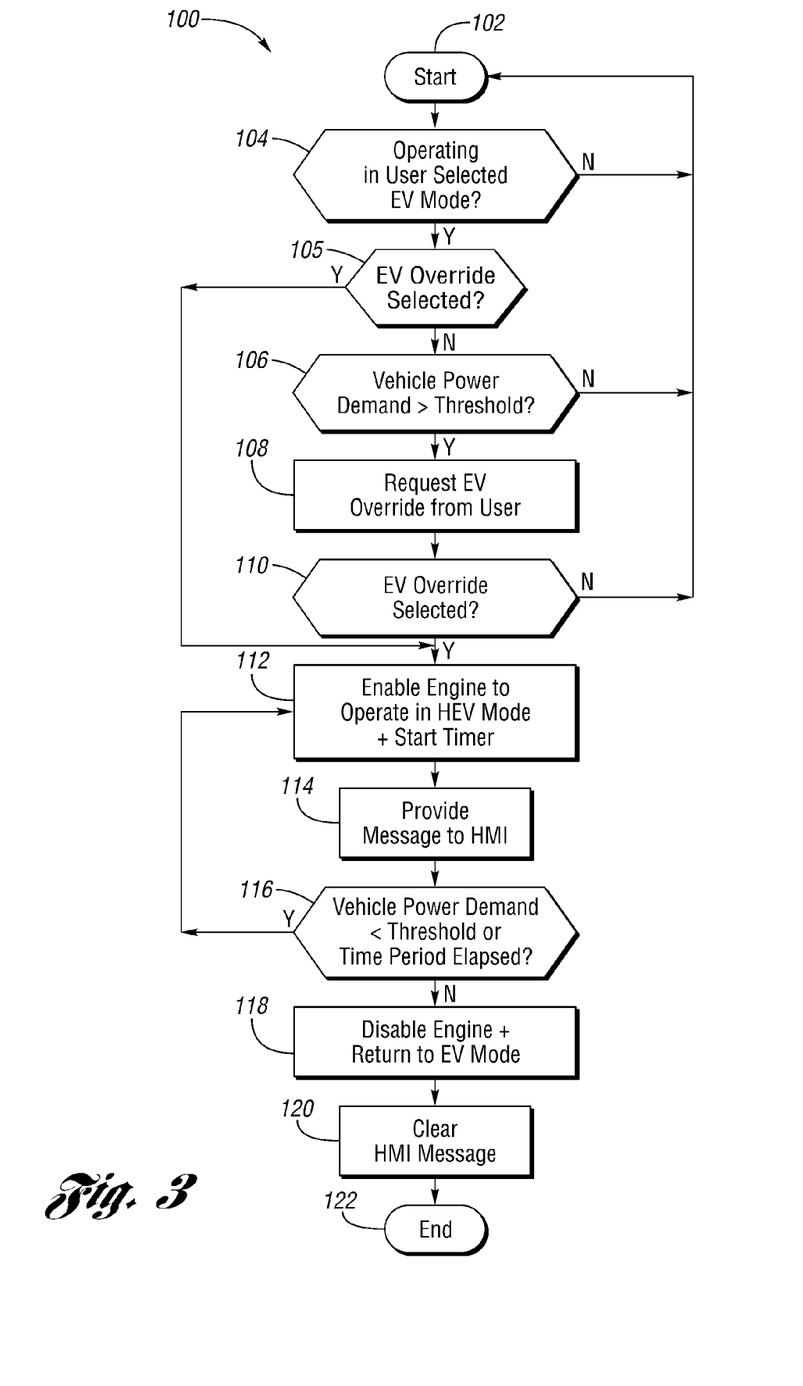
FIG. 3 is a flow chart illustrating an algorithm for use with the vehicle of FIG. 2 for a user override of a user selected EV mode of operation according to an embodiment.

FIG. 3 illustrates an embodiment of an algorithm 100 for implementing a user override of a user selected EV mode of operation for the vehicle. The algorithm 100 provides for a user override based on a user input or request to the vehicle that makes EV operation undesirable or requires the engine to be enabled to meet the user demand or request. The algorithm 100 causes the engine 56 to be enabled such that the vehicle can operate in a temporary hybrid mode of operation. The algorithm returns to the user selected EV mode of operation after a specified time period or when the user input or request requiring engine 56 enablement ceases to exist. The algorithm 100 then re-disables the engine 56 and returns to operate the vehicle in the user selected EV mode.

The algorithm 100 begins at 102, and proceeds to 104 to determine if the vehicle is operating in a user selected EV mode. For a user selected EV mode in one embodiment, the user has requested EV mode using the EV input 72 through the user interface 70. The controller 68 may determine if the vehicle is operating in EV mode based on the switch input from 72, as well as other vehicle states such as the engine 56 being disabled and the electric machine 60 being enabled or operating. If the vehicle is not in a user selected EV mode at 104, the algorithm 100 returns to the start at 102.

If the vehicle is operating in a user selected EV mode at 104, the controller 68 proceeds to determine if the user has selected an override of the EV mode at 105. The user override of EV mode places the vehicle in a hybrid mode of operation, such as a charge sustaining mode, and effectively delays operation of the vehicle in the EV mode that was originally selected. The user override of EV mode may be selected at any time the vehicle is operating in the user selected EV mode of operation using the user interface 70 and/or the switch input 72. For example, the user may select a user override of the user selected EV mode via user interface 70 and/or the switch 72 in anticipation of a passing maneuver, entering an expressway entrance ramp, driving up a steep grade, or the like. The engine 56 is now enabled, but will only be operated as necessary, i.e. when power demand exceeds what the battery and electric machine are capable of delivering. The engine 56 may be enabled for a predetermined time period, such that it is disabled and the vehicle returns to the user selected EV mode after the time period. If the power demand exceeds the capability of the electric driveline and the user override was selected, the engine 56 will be pulled up and used to help propel the vehicle. If the power demand on the vehicle does not require the engine to be used, the engine is not pulled up and at the end of the time period, the engine is disabled. If the user has not selected an override of the user selected EV mode, the algorithm 100 proceeds to 106.

At block 106, the controller 68 proceeds to determine if a user input or user request for the vehicle is beyond a threshold such that the engine 56 needs to be enabled to meet the request. In one embodiment, the controller 68 determines if a wheel torque demand is above a threshold, or above what the vehicle is capable of delivering electrically. In another embodiment, the controller 68 determines if an accelerator pedal position is beyond a threshold at 106, or within a predetermined range of positions. The accelerator pedal position threshold may be a specified value or may be obtained from a look up or calibration table in the VSC 68 that includes various factors including accelerator pedal position, torque demand, and torque available from the electric machine 60 and the engine 56 at the vehicle operating conditions and states. Ambient temperature, altitude, battery 66 SOC, battery 66 temperature, and other factors may also affect the threshold and be included in a calibration table.

The accelerator pedal position may be obtained from a pedal position sensor APPS, as shown in FIG. 2. The accelerator pedal relates to the torque demand or torque request for the vehicle 50. If the accelerator pedal position is beyond a threshold, the vehicle may not be able to meet torque demand using the electric machine 60 alone, and the engine 56 would need to be enabled to meet the user request. Pulling up the engine 56 at this point conflicts with the user placing the vehicle into a user selected EV mode of operation, and so the algorithm 100 proceeds to determine if the user wants to override the user selected EV mode at 108. The algorithm 100 prompts the user to select an override via the user interface 70, for example, using a message or popup. The user can select a user override using the user interface 70. The message or popup may remain on a display screen of the user interface 70 until the user request ends. For an accelerator pedal position, the pedal may need to be released past another threshold level to prevent hysteresis.

At 110, the algorithm 100 determines if an override was selected at 108. If the override was not selected, the algorithm 100 returns to the start at 102. The vehicle may not meet the torque demand or other user request, as the engine 56 was not enabled, and the electric machine 60 does not have the capacity to meet the request alone. The controller 68 may provide a message to the user interface 70 stating that the user selected EV operation is limiting vehicle performance in light of the user request. Alternatively, the controller 68 may enter an override mode if the user request, such as the accelerator pedal past a threshold value, exists for a predetermined time period.

If the override was selected at 108, the algorithm 100 proceeds from 110 to block 112. The algorithm 100 also proceeds to 112 from block 105 if the user has selected an override of the EV mode. At 112, the controller enables engine 56 operation, and in some embodiments starts a timer. The engine 56 is enabled such that the vehicle operates in an HEV mode with both the electric machine 60 and the engine 56 available for use. In one embodiment, the vehicle is operated in a charge depletion mode where the engine 56 and/or the electric machine 60 is used to propel the vehicle and the state of charge of the battery is generally decreased. In other embodiments, the vehicle may be operated in a charge sustaining mode, or other hybrid mode of operation. The controller has enabled the engine 56 for operation; however, the engine 56 may not operate continually during the user override based on the operating conditions for the vehicle. For example, the engine 56 may be enabled and not operating at 112 for some time period, such as when torque demand for the vehicle is met by the electric machine, and the like.

The controller 68 commands the display in the user interface 70 to provide a message to the user at 114. The user is informed of the user override of the user selected EV mode. The message provides information to the user to confirm the user selection of the override, to meet user expectations regarding vehicle operation, prevent confusion regarding engine operation after selecting an EV mode, to provide vehicle information to the user, and the like.

The algorithm 100 then determines if the entry condition or user request causing the override still exists at 116. The accelerator pedal position or overall vehicle wheel torque demand may need to be below its threshold for some predetermined time period to prevent hysteresis or cycling of the user override requests. If the user request still exists, such as the accelerator pedal remaining above its threshold value, the algorithm returns to 112 to continue enabling the engine 56.

If the user request ceases to exist after entering a user override, such as the accelerator pedal or wheel torque demand going below its threshold, or the specified time period expiring, the algorithm proceeds to 118 and re-disables operation of the engine 56 and returns vehicle operation to the original user selected EV mode automatically. The vehicle now operates using electric energy only and is propelled by the electric machine 60, as the engine 56 is disabled and not operating.

The algorithm 100 clears any messages displayed by the user interface 70 regarding the override at 120. These messages or popups were provided by block 114, as the vehicle state causing the system override of the EV selected mode has ceased to exist. The algorithm 100 either ends at 122 or cycles back to the start at 102.

Figure 4:
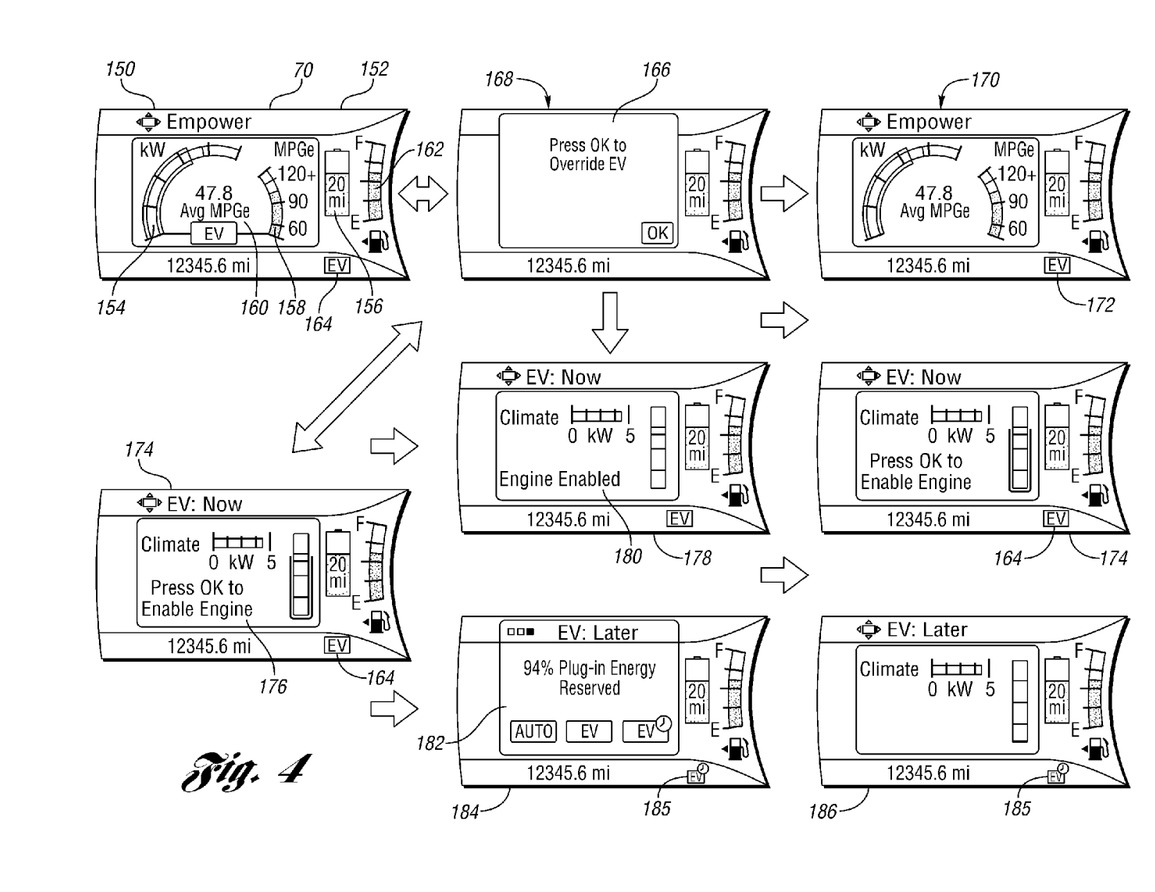
FIG. 4 is a flow chart illustrating a user interface implementing the algorithm of FIG. 3.

FIG. 4 illustrates an embodiment of a user interface 70 for use with the algorithm 100 and vehicle 50. The user interface 70 has a display screen 150. The screen 150 may be on the dashboard, the center console, incorporated into the vehicle gauge system, or the like. Of course, the screens as shown in FIG. 4, including any icons and messages, are according to an embodiment. Other embodiments may include other screen layouts, designs, and messages regarding the disclosure. The user interface has a general screen as shown at 152. The general screen 152 may be displayed during typical vehicle operation, and may include such information as the power available from the traction battery 154, mileage available in EV mode 156, the instantaneous or short term fuel economy 158, the average or long term fuel economy 160, and a fuel tank level gauge 162. When the EV mode is selected, an EV indicator light 164 may appear on the screen 150 to inform the user that the vehicle is operating in the EV mode. The indicator light 164 may change colors to inform the user of the status of the electric operation status of the vehicle, or there may be multiple indicators present to provide information regarding the mode of operation of the vehicle, i.e. EV, HEV, automatic, and the like.

When a user input or user request for the vehicle is beyond a threshold such that the engine 56 needs to be enabled to meet the request, the algorithm 100 sends a message to the display 150 requesting an override from the user to enable the engine 56, as shown by 166 on screen 168. In one embodiment, the controller 68 determines if the accelerator pedal position is beyond a threshold. Message 166 may be a popup, another display screen, or the like. In one embodiment, message 166 appears regardless of the background screen when the user input or request is above the threshold and the vehicle is in a user selected EV mode.

When the user acknowledges the message 166 by confirming the override through a user input, or after expiration of a suitable time period, the algorithm 100 changes the screen 150 to a general override screen at 170 or an EV override screen at 178, as described further below. The user input may be through a switch on the steering wheel, though the user interface 70 directly, via voice command, or the like. Override screen 170 may have an indicator light or message 172 that continues to inform the user of the override of the EV mode and that that engine 56 is enabled and may be operating. In one embodiment, the message 172 may be the indicator light 164 illuminated in a different color.

When the user input or request for the vehicle that causing the user override of EV mode ends such that the engine 56 no longer needs to be enabled, the screen 150 may be changed back to a general operating screen 152 with the EV indicator light 164 present. The controller 68 re-disables the engine 56 and returns the vehicle to operating in the user selected EV mode.

Alternatively, the user interface 70 display 150 may begin by showing an electric (EV) screen 174 before the user input or user request for the vehicle is beyond a threshold such that the engine 56 needs to be enabled to meet the request. The screen 174 may display various electric energy uses, such as electrical energy use by the HVAC system. The screen 174 may be displayed whenever the user has entered a user selected EV mode, and provides an interface for the user to select a user override of the EV mode whenever the user desires during the user selected EV mode. The user may navigate within the user interface 70 as well, for example by switch from screen 174 to screen 150 and vice versa. When a user input or user request for the vehicle is beyond a threshold such that the engine 56 needs to be enabled to meet the request, the algorithm 100 sends a message to the display 150 requesting an override from the user to enable the engine, as shown by the message or popup 176 on screen 174.

When the user acknowledges the message 176 by confirming the override through a user input, the algorithm 100 changes the screen 174 to the EV override screen at 178. The user input may be through a switch on the steering wheel, or though the user interface 70 directly. Override screen 178 may have an indicator light or message 180 that continues to inform the user of the override of EV mode and that that engine 56 is enabled and may be operating. In one embodiment, the message 180 may be the indicator light 164 in a different color.

When the user input or request for the vehicle that caused the user override of EV mode ends such that the engine 56 no longer needs to be enabled, the screen 178 may be changed back to a general EV screen 174 with the EV indicator light 164 present. The controller 68 re-disables the engine 56 and returns the vehicle to operating in the user selected EV mode.

Alternatively, from EV screen 174, the user may select another mode of operation for the vehicle using the EV input 72. In the embodiment shown, the user may select from automatic VSC operation of the vehicle, a user selected EV mode, and a user selected delayed EV mode where the vehicle may be operated in an HEV mode as shown by the popup or message 182 in screen 184. In some embodiments, the message 164 may clear from the screen 150 after a specified time period, and revert to a general screen display 152 with the addition of the EV indicator 185, which is shown as a delayed EV mode or EV later icon. If the user selects an automatic mode, the VSC 68 controls the mode of operation of the vehicle and exits the user selected EV mode, such that the vehicle continues to operate in the automatic mode even when the user input or request above its threshold ends. If the user selects HEV mode, the vehicle operates in a hybrid mode of operation where operation in an electric only mode is delayed. The HEV mode may be a generally charge sustaining mode.

After the user makes a selection using EV input 72, the user interface 70 may change the display 150. For example, if the user selects a delayed EV mode, or HEV mode, at screen 184, the display 150 will show screen 186. Screen 186 is a delayed EV mode screen, or HEV screen, as can be seen by the delayed EV mode or EV later icon 185.

As such, various embodiments according to the present disclosure provide associated non-limiting advantages. For example, the vehicle is configured for a user selected electric only (EV) mode of operation, allowing user control and input for vehicle operation. The user may override the user selected mode of operation using the user interface when a user input or request to the vehicle indicates a need for the engine to be enabled, and the vehicle to operate in a hybrid mode. The controller is configured to change the operating state of the vehicle to a hybrid mode of operation based on the user override. The controller sends a message to the user to confirm the override and that the vehicle is operating in a hybrid mode via a user interface such that the user's expectations regarding vehicle operation are met and the user is informed of potential engine operation after having selected an EV mode of operation for the vehicle. The controller is configured to return the vehicle to the user selected EV mode after the user input or request to the vehicle that caused the EV mode override and the engine to be enabled ends. The vehicle is returned to the user selected EV mode by the controller.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments that are not explicitly illustrated or described. Where one or more embodiments have been described as providing advantages or being preferred over other embodiments and/or over prior art with respect to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. As such, any embodiments described as being less desirable relative to other embodiments with respect to one or more characteristics are not outside the scope of the claimed subject matter.

What is claimed is:

1. A vehicle comprising:
an electric machine;
an engine; and
a controller configured to (i) in response to input selecting an electric-only operating mode, disable the engine such that the vehicle is propelled by the electric machine, (ii) in response to user power demand being greater than power available during the electric-only operating mode, generate a prompt to inquire whether to override by re-enabling the engine while remaining in the electric-only operating mode, and (iii) in response to user confirmation for the override, re-enable the engine to satisfy the user power demand while remaining in the user selected electric-only operating mode.

2. The vehicle of claim 1 wherein the controller is further configured to, in response to the user power demand subsequently being less than the power available during the electric-only operating mode, re-disable the engine.

3. The vehicle of claim 2 wherein the controller is further configured to re-disable the engine in response to the user power demand subsequently being less than the power available during the electric-only operating mode for a predetermined time period.

4. The vehicle of claim 1 wherein the user power demand is greater than the power available during the electric-only operating mode when an accelerator pedal position is within a predefined range of positions.

5. The vehicle of claim 1 wherein the controller is further configured to, in response to the user power demand being greater than the power available during the electric-only operating mode for a predetermined time period, re-enable the engine to satisfy the user power demand.

6. The vehicle of claim 1 wherein the controller is further configured to, in response to receiving an input selecting override, re-enable the engine for a predetermined time period.

7. A vehicle comprising:
an engine;
an electric machine;
a user interface; and
at least one controller configured to (i) in response to the user interface receiving input selecting an electric-only operating (EV) mode, disable the engine such that the vehicle is propelled by the electric machine, (ii) in response to the user interface receiving input for a temporary override of EV mode, re-enabling the engine for a predetermined time period during EV mode.

8. The vehicle of claim 7 wherein the at least one controller is further configured to, in response to expiration of the predetermined time period, re-disable the engine during EV mode.

9. The vehicle of claim 7 wherein the at least one controller is further configured to, in response to user power demand being greater than power available during the EV mode, provide a prompt via the user interface inquiring whether to enable the engine during the EV mode, and in response to user confirmation to the prompt, re-enable the engine to satisfy the user power demand while EV mode is selected.

10. The vehicle of claim 9 wherein the controller is further configured to, in response to the user power demand being subsequently less than the power available during the EV mode, disable the engine.

11. The vehicle of claim 9 wherein the user power demand is greater than the power available during the EV mode when an accelerator pedal position is within a predefined range of positions.

12. The vehicle of claim 9 wherein the user interface has a display screen, the controller configured to command the display screen to provide the prompt.

13. A method for controlling a vehicle comprising:
in response to user input selecting an electric-only operating (EV) mode, disabling an engine using a controller such that the vehicle is propelled by an electric machine; and
in response to receiving a user input to temporarily override the EV mode, re-enabling the engine using the controller for a predetermined time period while EV mode remains selected.

14. The method of claim 13 further comprising:

in response to user power demand being greater than power available during the EV mode, generating a prompt inquiring whether to temporarily override the EV mode; and in response to user confirmation to temporarily override the EV mode, re-enabling the engine to satisfy the user power demand while EV mode remains selected.

15. The method of claim 14 further comprising, in response to the user power demand subsequently being less than the power available during the EV mode, disabling the engine.

16. The method of claim 14 further comprising displaying the prompt via a user interface.

17. The method of claim 14 further comprising, in response to user power demand being greater than power available during the EV mode for a predetermined time period, re-enabling the engine to satisfy the user power demand.

18. The method of claim 14 wherein the user power demand is greater than the power available during the electric-only operating mode when an accelerator pedal position is greater than a threshold.

\* \* \* \* \*